(12) United States Patent
Zaghib et al.

(10) Patent No.: US 9,577,253 B2
(45) Date of Patent: Feb. 21, 2017

(54) POSITIVE-ELECTRODE MATERIALS: METHODS FOR THEIR PREPARATION AND USE IN LITHIUM SECONDARY BATTERIES

(71) Applicants: Hydro-Quebec, Montreal (CA); SEI Corporation, Tsu-shi (JP)

(72) Inventors: Karim Zaghib, Longueuil (CA); Abdelbast Guerfi, Brossard (CA); Pierre Hovington, Boucherville (CA); Takehiko Sawai, Tsu (JP); Shinji Saito, Tsu (JP); Kazunori Urao, Tsu (JP)

(73) Assignees: HYDRO-QUEBEC, Montreal (CA); SEI CORPORATION, Tsu (JP)

( * ) Notice: Subject to any disclaimer, the term of this patent is extended or adjusted under 35 U.S.C. 154(b) by 55 days.

(21) Appl. No.: 14/349,076

(22) PCT Filed: Oct. 4, 2012

(86) PCT No.: PCT/CA2012/050702
§ 371 (c)(1),
(2) Date: Apr. 2, 2014

(87) PCT Pub. No.: WO2013/049939
PCT Pub. Date: Apr. 11, 2013

(65) Prior Publication Data
US 2015/0037673 A1 Feb. 5, 2015

(51) Int. Cl.
*H01M 4/58* (2010.01)
*H01M 4/36* (2006.01)
(Continued)

(52) U.S. Cl.
CPC ........... *H01M 4/366* (2013.01); *H01M 4/0402* (2013.01); *H01M 4/043* (2013.01);
(Continued)

(58) Field of Classification Search
CPC .... H01M 4/366; H01M 4/0402; H01M 4/043; H01M 4/0471; H01M 4/136; H01M 4/1391; H01M 4/1393; H01M 4/1397; H01M 4/485; H01M 4/505; H01M 4/525; H01M 4/5825; H01M 4/587; H01M 4/623; H01M 4/625; H01M 10/052; H01M 2004/028; H01M 2220/20; Y02E 60/122
See application file for complete search history.

(56) References Cited

U.S. PATENT DOCUMENTS 5,631,100 A    5/1997   Yoshino et al.
5,910,382 A    6/1999   Goodenough et al.
(Continued)

FOREIGN PATENT DOCUMENTS

CA     2493299 A1    1/2004
CA     2684869 A1    11/2008
(Continued)

OTHER PUBLICATIONS

The Micromeritics No. 54 (2011), pp. 19-27 (Hosowawa Micron Corporation).
(Continued)

*Primary Examiner* — Raymond Alejandro
(74) *Attorney, Agent, or Firm* — Buchanan Ingersoll & Rooney P.C.

(57) ABSTRACT

A positive-electrode material for a lithium secondary battery which includes a lithium oxide compound or a complex oxide as reactive substance. The material also includes at least one type of carbon material, and optionally a binder. A first type of carbon material is provided as a coating on the reactive substance particles surface. A second type of carbon material is carbon black. And a third type of carbon material is a fibrous carbon material a mixture of at least two types
(Continued)

of fibrous carbon material different in fiber diameter and/or fiber length. Also, a method for preparing the material as well as lithium secondary batteries including the material.

14 Claims, 2 Drawing Sheets

(51) Int. Cl.

| | | |
|---|---|---|
| H01M 4/136 | (2010.01) | |
| H01M 4/04 | (2006.01) | |
| H01M 4/1397 | (2010.01) | |
| H01M 4/62 | (2006.01) | |
| H01M 4/1391 | (2010.01) | |
| H01M 4/1393 | (2010.01) | |
| H01M 4/505 | (2010.01) | |
| H01M 4/525 | (2010.01) | |
| H01M 4/587 | (2010.01) | |
| H01M 10/052 | (2010.01) | |
| H01M 4/485 | (2010.01) | |
| H01M 4/02 | (2006.01) | |

(52) U.S. Cl.
CPC ......... *H01M 4/0471* (2013.01); *H01M 4/136* (2013.01); *H01M 4/1391* (2013.01); *H01M 4/1393* (2013.01); *H01M 4/1397* (2013.01); *H01M 4/485* (2013.01); *H01M 4/505* (2013.01); *H01M 4/525* (2013.01); *H01M 4/587* (2013.01); *H01M 4/5825* (2013.01); *H01M 4/623* (2013.01); *H01M 4/625* (2013.01); *H01M 10/052* (2013.01); *H01M 2004/028* (2013.01); *H01M 2220/20* (2013.01); *Y02E 60/122* (2013.01)

(56) References Cited

U.S. PATENT DOCUMENTS

| 6,391,493 | B1 | 5/2002 | Goodenough et al. | |
|---|---|---|---|---|
| 6,855,273 | B2 * | 2/2005 | Ravet | H01B 1/24 |
| | | | | 252/506 |
| 8,753,772 | B2 * | 6/2014 | Liu | B82Y 30/00 |
| | | | | 252/182.1 |
| 2004/0013943 | A1 | 1/2004 | Stoker et al. | |
| 2010/0119949 | A1 | 5/2010 | Yano et al. | |
| 2010/0140554 | A1 | 6/2010 | Oki et al. | |
| 2010/0308277 | A1 | 12/2010 | Grupp | |
| 2011/0068294 | A1 | 3/2011 | Zaghib et al. | |
| 2011/0123858 | A1 | 5/2011 | Zaghib et al. | |
| 2011/0266495 | A2 | 11/2011 | Zaghib et al. | |
| 2012/0171566 | A1 | 7/2012 | Yoshitake et al. | |
| 2012/0258363 | A1 | 10/2012 | Kawasaki et al. | |

FOREIGN PATENT DOCUMENTS

| CA | 2716265 A1 | 9/2009 |
|---|---|---|
| CA | 2731678 A1 | 2/2010 |
| CA | 2 781 164 A1 | 5/2011 |
| EP | 1 491 501 A1 | 12/2004 |
| EP | 2 144 315 A1 | 1/2010 |
| JP | 5-226004 A | 9/1993 |
| JP | 9-134724 A | 5/1997 |
| JP | 2000-509193 A | 7/2000 |
| JP | 2003-168429 A | 6/2003 |
| JP | 2005-019399 A | 1/2005 |
| JP | 2007-242386 A | 9/2007 |
| JP | 2008-034376 A | 2/2008 |
| JP | 2009-043514 A | 2/2009 |
| JP | 2010219047 A | 9/2010 |
| JP | 2011060432 | 3/2011 |
| JP | 2001-126733 A | 5/2011 |
| JP | 2011-108522 A | 6/2011 |
| WO | WO 2010/113884 A1 | 10/2010 |

OTHER PUBLICATIONS

Supplementary European Search Report issued on May 20, 2015, by the European Patent Office in corresponding European Patent Application No. 12 839 054.9. (8 pages).
International Search Report (PCT/ISA/210) mailed on Jan. 10, 2013, by the Canadian Patent Office as the International Searching Authority for International Application No. PCT/CA2012/050702.
Written Opinion (PCT/ISA/237) mailed on Jan. 9, 2013, by the Canadian Patent Office as the International Searching Authority for International Application No. PCT/CA2012/050702.
An English Translation of the Office Action (Notification of Reason for Rejection) issued on Aug. 2, 2016, by the Japanese Patent Office in corresponding Japanese Patent Application No. 2014-533746 (6 pages).

* cited by examiner

POSITIVE-ELECTRODE MATERIALS: METHODS FOR THEIR PREPARATION AND USE IN LITHIUM SECONDARY BATTERIES

CROSS REFERENCE TO RELATED APPLICATIONS

The present application is a U.S. national stage entry of International Application No. PCT/CA2012/050702, filed on Oct. 4, 2012, which claims the benefit of Canadian Application No. 2,754,372, filed on Oct. 4, 2011. The entire contents of each of International Application No. PCT/CA2012/050702 and Canadian Application No. 2,754,372 are hereby incorporated herein by reference in their entirety.

FIELD OF THE INVENTION

The invention relates generally to positive-electrode materials comprising a lithium oxide compound for use in lithium secondary batteries. More specifically, the invention relates to positive-electrode materials comprising a lithium oxide compound and at least two types of carbon material.

BACKGROUND OF THE INVENTION

Rechargeable batteries having high capacity when they are charged and discharged at a high electricity current and that remain stable when the charge and discharge process is repeated during a long period of time are in high demand. Such batteries, which include lithium secondary batteries, are used for example in electric vehicles, hybrid cars and the like.

Typically, two categories of lithium secondary batteries are known. A first category in which the negative-electrode is formed by using a material capable of absorbing and discharging lithium ions, and a second category in which the negative-electrode is formed by using metallic lithium. Lithium secondary batteries in the first category present at least some advantages over those in the second category. For example in the first category, safety of the battery is enhanced since there is less dendrite deposit and thus a short circuit between the electrodes is less likely to occur. Also, batteries in the second category generally have higher capacity and energy density.

In recent years, lithium secondary batteries in which a negative-electrode is formed by using a material capable of absorbing and discharging lithium ions have been in high demand. Extensive research has been conducted aiming at improving the capacity of the battery when it is charged and discharged at a high electric current and also at improving its performance and life cycle, for up to several tens of thousands cycles. It has been found that the capacity of the battery is improved by decreasing its electrical resistance. Also, the following have been found to be advantageous: (a) use of a positive-electrode material comprising a lithium metal oxide as the reactive substance and a negative-electrode material comprising carbon, leads to a high capacity battery; (b) the total reactive surface of a substance in the battery is increased by decreasing the mean size diameter of the particles of the substance, or the reactive surface of the electrode is increased by optimizing the design of the battery; (c) liquid diffusion resistance is decreased by making a separator thin.

When the mean size diameter of the particles of the reactive material is small, the total reactive surface is increased. However, this necessitates an increase of the amount of binder used in the material. As a result, it becomes quite challenging to obtain a battery that has a high capacity. In addition, the positive-electrode and negative-electrode materials have a tendency to peel or drop from the metal foil on which they are deposited. And since these materials are electricity collectors, an internal short circuit inside the battery is likely to occur, resulting in a decrease in the voltage of the battery and thermal runaway. Safety of the lithium secondary battery is thus impaired.

Research has been conducted aiming at designing methods for increasing the adherence of the positive-electrode and negative-electrode materials to the metal foil on which they are deposited. Such methods include for example altering the type of binder, as disclosed for example in Japanese laid-open patent application No. 5-226004.

Also, methods have been designed for allowing the lithium secondary battery to have a high capacity when it is charged and discharged at a high electric current. For example, use of conductive carbon material to decrease the electrical resistance of the electrode has been disclosed; see for example Japanese laid-open patent applications No. 2005-19399, No. 2001-126733 and No. 2003-168429.

Although a suitable choice of binder used in the reactive material allows for an increase of the capacity of the battery, this does not appear to have a positive effect on the improvement of the property of the battery whereby it has a high capacity when charged and discharged at a high electric current, even when the electrical resistance of the electrode is decreased.

When the battery is cyclically charged and discharged at a high electric current, the positive-electrode and negative-electrode materials tend to expand and contract. This leads to conductive paths of particles between the positive and negative electrodes being impaired. As a result, a high electric current cannot be circulated early on when the battery is used, and the battery thus has a short life span.

In recent years, lithium metal phosphate compounds such as olivine-type lithium iron phosphate as reactive substances of the positive-electrode in lithium secondary batteries have attracted attention; see for example Japanese laid-open patent applications No. 2000-509193 and No. 9-134724. Indeed, this reactive substance is safe and contributes to a decrease in the cost of the battery since it is inexpensive. However, the substance has a high electrical resistance and attempts to decrease the resistance have been found quite challenging.

SUMMARY OF THE INVENTION

The present inventors have designed and prepared a material that comprises a lithium oxide compound and at least two types of carbon material. The material according to the invention is used in lithium secondary batteries. The batteries using the material according to the invention present improved electrical resistance properties.

The invention thus provides the following:
(1) A positive-electrode material for a lithium secondary battery, comprising a lithium oxide compound as reactive substance, at least one type of carbon material, and optionally a binder, wherein:
  a first type of carbon material is provided as a coating on the reactive substance particles surface;
  a second type of carbon material is carbon black; and
  a third type of carbon material is a fibrous carbon material provided as a mixture of at least two types of fibrous carbon material different in fiber diameter and/or fiber length.

(2) A positive-electrode material according to (1) above, wherein the lithium oxide compound comprises a metal which is a transition metal; preferably Fe, Mn, V, Ti, Mo, Nb, W, Zn or a combination thereof; more preferably Fe.

(3) A positive-electrode material according to (1) above, wherein the lithium oxide compound is a phosphate, an oxyphosphate, a silicate, an oxysilicate, or a fluorophosphate; preferably a phosphate.

(4) A positive-electrode material according to (1) above, wherein the lithium oxide is $LiFePO_4$, $LiMnPO_4$, $LiFeSiO_4$, $SiO$, $SiO_2$ or $SiO_x$ ($0 \leq x < 2$); preferably $LiFePO_4$.

(5) A positive-electrode material according to (1) above, wherein the lithium oxide compound is a lithium phosphate, preferably an olivine-type lithium iron phosphate.

(6) A positive-electrode material for a lithium secondary battery, comprising a complex oxide compound as reactive substance, at least one type of carbon material, and optionally a binder, wherein:
   a first type of carbon material is provided as a coating on the reactive substance particles surface;
   a second type of carbon material is carbon black; and
   a third type of carbon material is a fibrous carbon material provided as a mixture of at least two types of fibrous carbon material different in fiber diameter and/or fiber length, wherein the complex oxide compound is a complex oxide of general formula $A_a M_m Z_z O_o N_n F_f$,
wherein:
   A represents an alkaline metal, preferably Li;
   M represents a transition metal, and optionally at least one non-transition metal, or a mixture thereof; preferably M is Fe, Mn, V, Ti, Mo, Nb, W, Zn or a mixture thereof, and optionally a non-transition metal which is Mg or Al; more preferably, M is Fe;
   Z represents a non-metallic element, preferably Z is P, S, Se, As, Si, Ge, B or a mixture thereof;
   N is a nitrogen atom;
   F is a fluorine atom; and
   $a \geq 0$, $m \geq 0$, $z \geq 0$, $o > 0$, $n \geq 0$ and $f \geq 0$, a, m, o, n, f and z being selected to ensure electro neutrality of the complex oxide.

(7) A positive-electrode material according to any one of (1) to (6) above, wherein the carbon material coating is in graphene or amorphous form, and bonds are formed between carbon atoms, thereby facilitating electron conductivity.

(8) A positive-electrode material according to any one of (1) to (6) above, wherein a thickness of the carbon material coating layer is about 1 to 10 nm, preferably about 2 to 4 nm.

(9) A positive-electrode material according to any one of (1) to (6) above, wherein the carbon black is conductive carbon black; preferably acetylene black, ketjen black or a combination thereof.

(10) A positive-electrode material according to any one of (1) to (6) above, wherein the fibrous carbon material is a carbon nanotube, a carbon nanofiber or a combination thereof.

(11) A positive-electrode material according to any one of (1) to (6) above, wherein the at least two types of fibrous carbon material are different in fiber diameter and fiber length.

(12) A positive-electrode material according to any one of (1) to (6) above, wherein a first type of the fibrous carbon material has fiber diameters of about 5 to 15 nm and fiber lengths of about 1 to 3 μm, and a second type of the fibrous material has fiber diameters of about 70 to 150 nm and fiber lengths of about 5 to 10 μm.

(13) A positive-electrode material according to any one of (1) to (6) above, wherein a combined amount of the carbon black and the fibrous carbon material is not less than about 2 wt % for a total amount of the material.

(14) A positive-electrode material according to any one of (1) to (6) above, wherein a weight ratio of the carbon black and the fibrous carbon material is about (2 to 8)/(1 to 3), preferably 6/2.

(15) A positive-electrode material according to any one of (1) to (6) above, wherein the binder is a fluorine-containing resin, preferably polytetrafluoroethylene, vinylidene polyfluoride, or fluororubber; a thermoplastic resin, preferably polypropylene or polyethylene; a dispersion-type resin, preferably styrene butadiene rubber or polymer of acrylic acid; or a combination thereof.

(16) A method of preparing a positive-electrode material for a lithium secondary battery, comprising:
   (a) providing a lithium oxide compound as reactive substance;
   (b) coating the reactive substance particles surface with a carbon material; and
   (c) mixing the coated reactive substance with carbon black, a mixture of at least two types of fibrous carbon material different in fiber diameter and/or fiber length, and optionally a binder, wherein step (c) is performed by compression shear impact-type particle-compositing technique.

(17) A method of preparing a positive-electrode material for a lithium secondary battery, comprising:
   (a) providing a complex oxide compound as reactive substance;
   (b) coating the reactive substance particles surface with a carbon material; and
   (c) mixing the coated reactive substance with carbon black, a mixture of at least two types of fibrous carbon material different in fiber diameter and/or fiber length, and optionally a binder, wherein step (c) is performed by compression shear impact-type particle-compositing technique, and
wherein:
   A represents an alkaline metal, preferably Li;
   M represents a transition metal, and optionally at least one non-transition metal, or a mixture thereof; preferably M is Fe, Mn, V, Ti, Mo, Nb, W, Zn or a mixture thereof, and optionally a non-transition metal which is Mg or Al; more preferably, M is Fe;
   Z represents a non-metallic element, preferably Z is P, S, Se, As, Si, Ge, B or a mixture thereof;
   N is a nitrogen atom;
   F is a fluorine atom; and
   $a \geq 0$, $m \geq 0$, $z \geq 0$, $o > 0$, $n \geq 0$ and $f \geq 0$, a, m, o, n, f and z being selected to ensure electro neutrality of the complex oxide.

(18) A method according to (16) above or 17, further comprising (d) calcining the mixture obtained in step (c).

(19) A method according to (16) or (17) above, wherein step (d) is performed at a temperature of about 700 to 850° C., preferably about 720° C.

(20) A method according to (16) or (17) above, wherein step (d) is performed during a period of time of about 0.5 to 2 hours, preferably about 1 hour.

(21) A method according to (16) or (17) above, wherein step (d) is performed under inert atmosphere, preferably argon atmosphere.

(22) A method according to (16) above, wherein the lithium oxide compound comprises a metal which is a transition metal; preferably Fe, Mn, V, Ti, Mo, Nb, W, Zn or a combination thereof; more preferably Fe.

(23) A method according to (16) above, wherein the lithium oxide compound is a phosphate, an oxyphosphate, a silicate, an oxysilicate, or a fluorophosphate; preferably a phosphate.

(24) A method according to (16) above, wherein the lithium oxide is LiFePO4, LiMnPO4, LiFeSiO4, SiO, SiO2 or SiOx (0≤x<2); preferably LiFePO4.

(25) A method according to (16) above, wherein the lithium oxide compound is a lithium phosphate, preferably an olivine-type lithium iron phosphate.

(26) A lithium secondary battery comprising the electrode-positive material as defined in any one of (1) to (15) above.

DESCRIPTION OF PREFERRED EMBODIMENTS

A lithium secondary battery is a secondary battery in which an electrolyte is penetrated into a group of electrodes wound or layered one upon another with a separator being interposed between a positive-electrode plate and a negative-electrode plate, or the group of electrodes is immersed in the electrolyte to repeatedly absorb and release lithium ions. A positive-electrode material is formed on the surface of the positive-electrode plate, and a negative-electrode material is formed on the surface of the negative plate.

In accordance with the invention, the positive-electrode material comprises an active substance which is a lithium metal oxide compound, and at least two types of carbon material. In embodiments of the invention, a first type of carbon material is in close contact with the surface of particles in the reactive substance; this carbon material can be in a graphene form, amorphous form or the like. A second type of carbon material in the positive-electrode material is a carbon black. A third type of carbon material in the positive-electrode material consists of a mixture of two types of fibrous carbon material.

Figure 1:
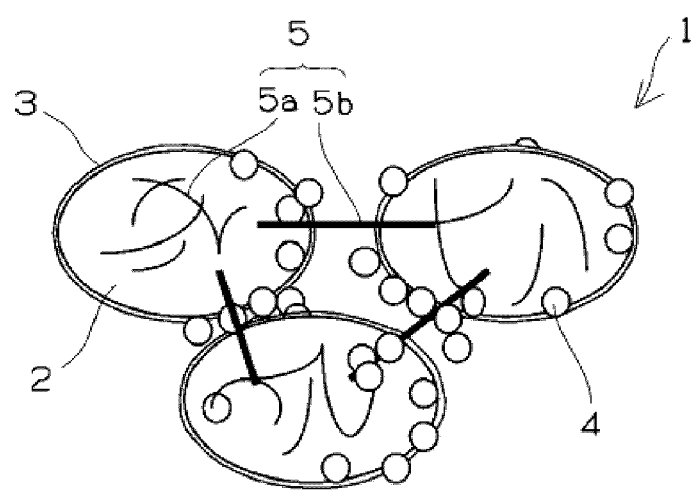
FIG. 1 illustrates a pattern diagram of a positive-electrode material for a lithium secondary battery.

As can be seen in FIG. 1, a positive-electrode material 1 comprises an active substance which is a lithium phosphate compound 2. The surface of the particles of the compound is coated with a carbon material 3. The coating layer can be in a graphene form, an amorphous form or the like. The thickness of the carbon material coating layer 3 can be several nanometers. The lithium phosphate compound 2 is combined with the carbon black 4 and the fibrous carbon material 5. The fibrous carbon material 5 is a mixture of a first fibrous carbon material 5a having a small fiber diameter and a short fiber length and a second fibrous carbon material 5b having a large fiber diameter and a long fiber length. The first fibrous carbon material 5a is mainly connected to the surface of particles of the lithium phosphate compound 2, whereas the second fibrous carbon material 5b mainly connects particles of the lithium phosphate compound 2.

Figure 2:
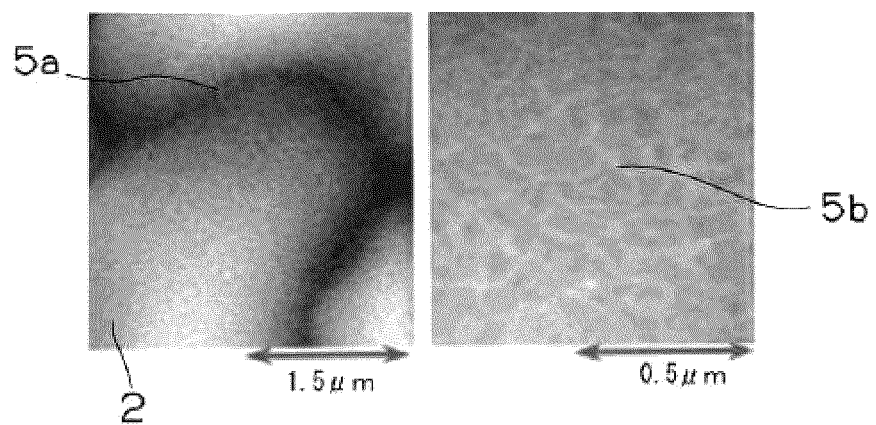
FIG. 2 shows a photograph of the surface of the positive-electrode material taken by a transmission-type electron microscope.

As can be seen in FIG. 2, the first fibrous carbon material 5a is mainly present on the surface of particles of the lithium phosphate compound 2. And the second fibrous carbon material 5b is present between particles of the lithium phosphate compound 2.

Examples of lithium phosphate compounds that can be used for the positive-electrode material of the present invention include LiFePO4, LiCoPO4, and LiMnPO4. In embodiments of the invention, olivine-type lithium iron phosphate, LiFePO4 is used. Indeed, LiFePO4 presents excellent electrochemical properties and safety, and is inexpensive. As will be understood by a skilled person, any suitable lithium oxide compound can be used.

The positive-electrode material 1 according to the invention can be defined generally as being based on complex oxides of general formula $A_a M_m Z_z O_o N_n F_f$, wherein:

A represents one or more alkaline metals which can be for example Li.

M represents one or more transition metals, and optionally at least one non-transition metal, or a mixture thereof. For example M can be Fe, Mn, V, Ti, Mo, Nb, W, Zn or mixtures thereof, and optionally a non-transition metal, which can be Mg or Al.

Z represents one or more non-metallic elements, wherein a≥0, m≥0, z≥0, o≥0, n≥0 and f≥0, the coefficients a, m, o, n, f and z being selected to ensure electro neutrality. For example Z can be P, S, Se, As, Si, Ge, B or a mixture thereof.

N is a nitrogen atom.

F is a fluorine atom.

For examples, complex oxides that can be used in the invention include phosphate, oxyphosphate, silicate, oxysilicate, and fluorophosphate. Preferably, the complex oxide is LiFePO4, LiMnPO4, LiFeSiO4, SiO, SiO2 or SiOx (0≤x<2). As will be understood by a skilled person, any suitable complex oxide can be used.

The surface of particles of the olivine-type lithium iron phosphate is coated with carbon material 3. At least one carbon material coating layer is formed on the particles surface. The coating layer can be in a graphene form, an amorphous form or the like. The carbon material coating layers are formed by methods generally known in the art. Such methods include for example: (a) dispersing conductive carbon black such as acetylene black, Ketjen Black or graphite crystal in a solvent to form a slurry coating solution, dispersing particles of the olivine-type lithium iron phosphate in the coating solution, and thereafter drying the solvent; (b) applying an organic substance or an organic polymer solution to the surface of the particles of the olivine-type lithium iron phosphate and thermally decomposing the organic substance or the organic polymer in a reducing atmosphere; (c) an ion deposit method; and (d) forming a thin film on the surface of the particles of the olivine-type lithium iron phosphate by chemical evaporation method (CVD) and/or a physical evaporation method (PVD).

In accordance with the present invention, as used herein, "graphene form" means one layer of a plain six-membered ring structure of $sp^2$-connected carbon atoms; and "amorphous form" means a three-dimensional six-membered ring structure. Electron conductivity occurs due to bonds between carbon atoms, which are facilitated by the graphene form or amorphous form of the carbon material coating. Also as used herein the term "about" means plus or minus 10% of the stated value.

The carbon material coating 3 is in close contact with the surface of particles of the active substance 2. The thickness of the carbon material coating layer is about 1 to 10 nm, preferably about 2 to 5 nm. When the thickness of the coating layer is less than 1 nm, electron conductivity through bonds between carbon atoms is limited. When the thickness of the coating layer is greater than about 10 nm, diffusion of lithium ions on the surface of particles of the active substance decreases, and output property of the battery deteriorates.

In accordance with the invention, a second type of carbon material in the positive-electrode material is carbon black. In embodiments of the invention, carbon black can be for example conductive carbon black 4. Such conductive carbon black includes for example acetylene black and Ketjen black. As will be understood by a skilled person, any suitable carbon black material can be used.

In accordance with the invention, a third type of carbon material in the positive-electrode material is fibrous carbon material 5. The fibrous carbon material can be a carbon nanotube or a carbon nanofiber. As used herein, "carbon nanotube" means a tube consisting of a single-walled ring, and "carbon nanofiber" means a tube consisting of a multi-walled ring.

In embodiments of the invention, the fibrous carbon material 5 is a mixture of the two types of fibrous carbon material 5a, 5b. The two types can be different in at least one of fiber diameters and fiber lengths. That is, it is possible to use (a) fibrous carbon materials different in both fiber diameters and the fiber lengths, (b) fibrous carbon materials equal in fiber diameters but different in fiber lengths, and (c) fibrous carbon materials different in fiber diameters but equal in fiber lengths. Preferably, fibrous carbon material different in both fiber diameters and fiber lengths are used.

The diameter of one type of fibrous carbon material can be about 5 to 15 nm, while the diameter of the other type of fibrous carbon material is about 70 to 150 nm. Preferably, the diameter of one type of the fibrous carbon material is about 10 nm, while the diameter of the other type of fibrous carbon material is about 100 nm.

The fiber length of the fibrous carbon material having diameter of about 5 to 15 nm can be about 1 to 3 µm, preferably about 3 µm. The fiber length of the fibrous carbon material having the diameter of about 70 to 150 nm can be about 5 to 10 µm, preferably about 5 µm. That is, in the present invention, it is preferable to use a mixture of two types of fibrous carbon materials, a first type having a small fiber diameter and a short fiber length and a second type having a large fiber diameter and a long fiber length.

In the positive-electrode material of the present invention, a total content of the carbon black and a total content of the fibrous carbon material is not less than about 2 wt %, preferably about 2 to 10 wt % of a total amount of the lithium phosphate compound coated with carbon material, the carbon black, and the fibrous carbon material.

In embodiments of the invention, a weight ratio of carbon black and fibrous carbon material (carbon black/fibrous carbon material) is about (2 to 8)/(1 to 3), preferably about 6/2.

The positive-electrode material of the present invention is prepared by mixing together the lithium phosphate compound 2 coated with carbon material 3, the carbon black 4, and the fibrous carbon material 5. This is performed a method known as compression shear impact-type particle-compositing method. As will be understood by a skilled person any suitable mixing technique can be used.

In the compression shear impact-type particle-compositing method, powders applied to an inner wall of a rotary container by a centrifugal force are mixed between the rotary container and a press head, having a radius of curvature different from that of the rotary container, which is fixed to the inside of the rotary container, while a strong compression shearing force is being applied to the powders. A mixing apparatus used in this method can be for example a Nobilta™ machine or a Mechanofusion™ mixing machine (Hosokawa Micron Corporation).

Following the mixing step as described above, the mixture is calcined, thereby causing the surfaces of particles of the reactive substance to composite with one another due to the bond between the carbon atoms. As a result, electron conductivity between the particles surfaces of the material is greatly improved. In embodiments of the invention, the mixture can be calcined at a temperature of about 700 to 850° C., under an inert atmosphere, for about 0.5 to 2 hours. Preferably, the mixture is calcined at a temperature of about 720° C., under inert atmosphere, for about 1 hour. The inert atmosphere can be for example an argon atmosphere.

In accordance with the invention, binders can be used in the positive-electrode material. Suitable binders are selected such that they are physically and chemically stable under the conditions inside the battery. Such binders include for example fluorine-containing resin such as polytetrafluoroethylene, vinylidene polyfluoride, and fluororubber; thermoplastic resin such as polypropylene and polyethylene; and dispersion-type resin such as styrene butadiene rubber and polymers of acrylic acid.

In accordance with the invention, a separator is used in the lithium secondary battery together with the positive-electrode material. The separator electrically insulates the positive-electrode and the negative-electrode from one another. In embodiments of the invention, a film made of a synthetic resin, a fiber, or an inorganic fiber can be used as separator. Preferably, a polyethylene film or a polypropylene film; woven cloth and unwoven cloth made of these resins; and glass fibers and cellulose fibers are used.

In accordance with the invention, electrolytes of the lithium secondary battery in which the group of electrodes is immersed include for example non-aqueous electrolytes containing lithium salts or ion-conducting polymers. In embodiments of the invention, non-aqueous solvents in the non-aqueous electrolytes containing the lithium salts, ethylene carbonate (EC), propylene carbonate (PC), diethyl carbonate (DEC), dimethyl carbonate (DMC), and methyl ethyl carbonate (MEC) can be used. As will be understood by a skilled person, any suitable electrolyte can be used.

In accordance with the invention, lithium salts dissolved in the electrolyte. In embodiments of the invention, lithium salts dissolved in non-aqueous electrolytes can be for example lithium hexafluorophosphate ($LiPF_6$), lithium borotetrafluoride ($LiBF_4$), and lithium trifluoromethanesulfonate ($LiSO_3CF_4$). As will be understood by a skilled person, any suitable lithium salt can be used.

In accordance with the invention, the positive-electrode material for the lithium secondary battery can be formed by layering the material on the surface of the positive-electrode plate serving as an electricity collector. The positive-electrode plate can be for example metal thin films. In embodiments of the invention, an aluminum foil can be used as the positive-electrode plate. And for the negative-electrode plate, a copper foil or a plate made of carbon material can be used.

EXAMPLES

The positive-electrode material of the present invention for lithium secondary batteries is described in detail below by way of examples and comparative examples. However, it will be understood that the present invention is not limited to those examples.

Examples 1, 2 and Comparative Examples 1 Through 5

The olivine-type lithium iron phosphate (LiFePO$_4$) having a mean particle diameter of about 0.5 to 2 μm was used as the active substance of the positive-electrode. The olivine-type lithium iron phosphate was coated with the carbon material forming a coating layer having a thickness of about 3 nm, using an evaporation method in which carbonized gas was used.

Carbon nanotube and acetylene black having configurations and amounts shown in Table 1 were added to the active substance and mixed together using the Nobilta mixing machine (Hosokawa Micron Corporation) by compression shear impact-type particle-compositing method. The mixing ratio between the carbon nanotube and acetylene black (acetylene black/carbon nanotube) was about 8/2 in a mass ratio. The mixing method carried out by using the Nobilta mixing machine is shown as "mixing" in the column of "electrical conductive material addition method" in Table 1.

Six parts by mass of vinylidene polyfluoride was added to 97 parts by mass of the mixture as a binder. N-methylpyrrolidone was added as a dispersion solvent to the mixture. The components were kneaded to prepare a positive-electrode slurry as the active substance of the positive-electrode for the lithium secondary battery.

An aluminum foil having a thickness of 20 μm and a width of 150 mm was prepared. The positive-electrode slurry was applied to both surfaces of the aluminum foil and dried. Thereafter the aluminum foil to which the positive-electrode slurry was applied was pressed and cut to obtain a positive-electrode plate for the lithium secondary battery. The total thickness of the positive-electrode plate after the positive-electrode slurry was applied to both surfaces of the aluminum foil and the aluminum foil was dried and pressed was 160 μm.

A laminate battery of 20 mAh was produced by using the positive-electrode plate. A negative pole made of graphite material was used as the electrode opposite to the positive-electrode plate. Unwoven cloth made of olefin fiber was used as a separator for electrically insulating the positive-electrode plate and the negative-electrode plate from each other. An electrolyte used was composed of lithium hexafluorophosphate (LiPF$_6$) dissolved at 1 mol/l in a solution in which ethylene carbonate (EC) and methyl carbonate (MEC) were mixed with each other at a volume ratio of 30:70.

To examine the discharge performance of the batteries, a discharge test and a life cycle test were conducted.

Discharge Test

After the battery was charged, charge/discharge efficiency became nearly 100% was confirmed, a discharged capacity was measured when each battery was discharged up to 2.0 V at a constant electric current of 4 mA. Thereafter a discharged capacity was measured at electric current of 200 mA. The discharged capacity at the electric current of 200 mA was expressed as the ratio with respect to the discharged capacity at the electric current of 4 mA. The discharge performance is shown in Table 1 as evaluation of discharge test (%).

Life Cycle Test

Each battery was charged (finished at electric current of 1 mA) at a constant electric current and a constant voltage of 4.0 V (limited electric current of 60 mA). Each battery was discharged up to 2.0 V at a constant electric current of 60 mA. Each charging and discharging operation was suspended for 10 minutes. A series of charge, suspension, and discharge was set as one cycle. The ratio of a discharged capacity at the 200th cycle to that at the first cycle was calculated as the discharge capacity maintenance ratio. The discharge capacity maintenance ratio is shown in Table 1 as a life cycle test (%).

Examples 3 Through 5

Olivine-type lithium iron phosphate (LiFePO$_4$) having a secondary particle diameter of 0.5 to 2 μm was used as the active substance of the positive-electrode. The olivine-type lithium iron phosphate was coated with the carbon material and a coating layer having a thickness of about 3 nm was formed. This was done by using an evaporation method in which carbonized gas was used.

Carbon nanotube and acetylene black having configurations and amounts shown in Table 1 were added to the active substance of the positive electrode and mixed together in the Nobilta mixing machine (Hosokawa Micron Corporation) by compression shear impact-type particle-compositing method.

The mixture was calcined at 700 to 800° C. for one hour under inert atmosphere. The case in which the mixture was calcined after the above-described components were mixed with each other using the Nobilta mixing machine is shown as "compositing" in the column of "electrical conductive material addition method" in Table 1.

By using the calcined mixture, a positive-electrode slurry was produced by a method similar to that of Example 1. By using the positive-electrode slurry, a laminate battery of 20 mAh was produced in a method similar to that of Example 1. Table 1 shows results of evaluation made in a method similar to that of Example 1.

TABLE 1

| Type of battery | Electrical conductive material addition method | Carbon nanotube Diameter (nm) | Length (μm) | Total amount of electrical conductive material (mass %) | Evaluation of discharge test (%) | Life cycle test (%) |
|---|---|---|---|---|---|---|
| Example 1 | Mixing | 10 | 10 | 3 | 86 | 83 |
|  |  | 100 | 10 |  |  |  |
| Example 2 | Mixing | 10 | 2 | 3 | 91 | 89 |
|  |  | 100 | 10 |  |  |  |
| Example 3 | Compositing | 10 | 10 | 3 | 92 | 91 |
|  |  | 100 | 10 |  |  |  |
| Example 4 | Compositing | 10 | 2 | 3 | 95 | 96 |

TABLE 1-continued

| Type of battery | Electrical conductive material addition method | Carbon nanotube Diameter (nm) | Length (μm) | Total amount of electrical conductive material (mass %) | Evaluation of discharge test (%) | Life cycle test (%) |
|---|---|---|---|---|---|---|
| Example 5 | Compositing | 100<br>10<br>100 | 10<br>2<br>10 | 8 | 99 | 98 |
| Comparative example 1 | Mixing | 200 | 15 | 1 | 22 | 19 |
| Comparative example 2 | Mixing | 200 | 7 | 1 | 31 | 33 |
| Comparative example 3 | Mixing | 3 | 15 | 1 | 53 | 48 |
| Comparative example 4 | Mixing | 3 | 7 | 1 | 60 | 55 |
| Comparative example 5 | Mixing | 3 | 7 | 3 | 82 | 72 |

The results of the evaluation of the discharge test shown in Table 1 indicate that the lithium secondary batteries using the positive-electrode materials of the Examples 1 through 5 have improved properties over batteries using the positive-electrode materials of the comparative examples 1 through 5.

For example, in Example 1, a mixture of two types of carbon nanotubes small and large in the fiber diameters was used. In Comparative Example 1, only one type of carbon nanotube large in its fiber diameter and long in its fiber length was used. In Comparative Example 2, only one type of carbon nanotube large in its fiber diameter and short in its fiber length was used. In Comparative Example 3, only one type of carbon nanotube small in its fiber diameter and long in its fiber length was used. In each of Comparative Examples 4 and 5, only one type of carbon nanotube small in the fiber diameter thereof and short in the fiber length thereof was used.

The results of the evaluation of Comparative Examples 1 through 5 indicate that the battery has excellent performance when it contains a large amount of the carbon nanotube small in its fiber diameter and the carbon nanotube large in its fiber diameter. It is considered that this is attributed to the conductivity of the olivine-type lithium iron phosphate which is active substance particles and excellence in a conductive network of particles. As in the case of the battery of Comparative Example 5, the battery containing a large absolute amount of electrical conductive materials has improved properties.

But as shown in Examples 1 through 5, when a mixture of two types of carbon nanotubes small and large in the fiber diameters thereof was used, excellent results were obtained in the discharge test and the cycle life test. This is attributed to an improved electron conductivity owing to the disposition of the mixed carbon nanotubes on the surface of the active substance particles and between the active substance particles.

It is more favorable to vary the fiber length of the carbon nanotubes and form a network between the carbon nanotubes and particles disposed on the periphery thereof.

The carbon nanotubes of Examples 3 through 5 bond with the surfaces of the particles of the positive-electrode active substance by compositeness not by contact resistance between carbon particles but by bond between carbon atoms (C—C). This is the reason why the batteries of Examples 3 through 5 have an improved electron conductivity.

Acetylene black is present on the surfaces of the particles of the active substance of the positive-electrode and carbon nanotubes. Therefore the acetylene black bonds not only with the carbon coating the surfaces of the particles of the active substance of the positive-electrode, but also with the carbon nanotubes. It is considered that all particles are coated with two layers of the electrical conductive carbon material.

The results of the evaluation made in the life cycle test in which each battery was charge and discharged at a high current had a tendency similar to that of the results of the evaluation made in the discharge test. The discharge test and the life cycle test prove that the lithium secondary battery using the positive-electrode material of the present invention present improved properties.

Although the present invention has been described hereinabove by way of specific embodiments thereof, it can be modified, without departing from the spirit and nature of the subject of the invention as defined in the appended claims.

The present invention refers to a number of documents, the content of which is herein incorporated by reference in their entirety.

The invention claimed is:

1. A positive-electrode material for a lithium secondary battery, comprising a lithium oxide compound as reactive substance, carbon material, and optionally a binder, wherein the carbon material comprises:
   a first carbon material, the first carbon material being a coating on the reactive substance;
   a second carbon material, the second carbon material being carbon black; and
   a third carbon material, the third carbon material being a fibrous carbon material comprising a mixture of at least two fibrous carbon materials, wherein one of the fibrous carbon materials has fiber diameters of about 5 to 15 nm and the other of the fibrous carbon materials has fiber diameters of about 70 to 150 nm.

2. A positive-electrode material according to claim 1, wherein the lithium oxide compound comprises a metal which is a transition metal.

3. A positive-electrode material according to claim 1, wherein the lithium oxide compound is a phosphate, an oxyphosphate, a silicate, an oxysilicate, or a fluorophosphate.

4. A positive-electrode material according to claim 1, wherein the lithium oxide is $LiFePO_4$, $LiMnPO_4$, $LiFeSiO_4$, $SiO$, $SiO_2$ or $SiO_x$ wherein $0 \leq x < 2$.

5. A positive-electrode material according to claim 1, wherein the first carbon material is in graphene or amorphous form, and bonds are formed between carbon atoms, thereby facilitating electron conductivity.

6. A positive-electrode material according to claim 1, wherein a thickness of the coating of the first carbon material is about 1 to 10 nm.

7. A positive-electrode material according to claim 1, wherein the carbon black is conductive carbon black.

8. A positive-electrode material according to claim 1, wherein the at least two fibrous carbon materials are carbon nanotubes, carbon nanofibers or a combination thereof; and wherein the at least two fibrous carbon materials are different in fiber length.

9. A positive-electrode material according to claim 1, wherein the fibrous carbon materials having fiber diameters of about 5 to 15 nm have fiber lengths of about 1 to 3 μm, and the fibrous carbon materials having fiber diameters of about 70 to 150 nm have fiber lengths of about 5 to 10 μm.

10. A positive-electrode material according to claim 1, wherein a combined amount of the second and third carbon materials is not less than about 2 wt % for a total amount of the carbon material.

11. A positive-electrode material according to claim 1, wherein a weight ratio of the second and third carbon materials is about (2 to 8)/(1 to 3).

12. A positive-electrode material according to claim 1, wherein the binder is a fluorine-containing resin, a thermoplastic resin, a dispersion resin, or a combination thereof.

13. A lithium secondary battery comprising the electrode-positive material as defined in claim 1.

14. A positive-electrode material for a lithium secondary battery, comprising a complex oxide compound as reactive substance, carbon material, and optionally a binder, wherein the carbon material comprises:
- a first carbon material, the first carbon material being a coating on the reactive substance;
- a second carbon material, the second carbon material being carbon black; and
- a third carbon material, the third carbon material being a fibrous carbon material comprising a mixture of at least two fibrous carbon materials, wherein one of the fibrous carbon materials has fiber diameters of about 5 to 15 nm and the other of the fibrous carbon materials has fiber diameters of about 70 to 150 nm, wherein the complex oxide compound is a complex oxide of general formula $A_a M_m Z_z O_o N_n F_f$, wherein:
A represents an alkaline metal;
M represents a transition metal, and optionally at least one non-transition metal, or a mixture thereof;
Z represents a non-metallic element;
N is a nitrogen atom;
F is a fluorine atom; and
$a \geq 0$, $m \geq 0$, $z \geq 0$, $o > 0$, $n \geq 0$ and $f \geq 0$, a, m, o, n, f and z being selected to ensure electro neutrality of the complex oxide.

* * * * *